(12) United States Patent
Ilghar et al.

(10) Patent No.: US 9,336,536 B1
(45) Date of Patent: May 10, 2016

(54) PRE-GENERATING BLANK APPLICATION INSTANCES TO IMPROVE RESPONSE TIME

(71) Applicants: Kaderjan Ilghar, San Jose, CA (US); Alexandre Parandian, Foster City, CA (US)

(72) Inventors: Kaderjan Ilghar, San Jose, CA (US); Alexandre Parandian, Foster City, CA (US)

(73) Assignee: SUCCESSFACTORS, INC., South San Francisco, CA (US)

( * ) Notice: Subject to any disclaimer, the term of this patent is extended or adjusted under 35 U.S.C. 154(b) by 0 days.

(21) Appl. No.: 14/534,003

(22) Filed: Nov. 5, 2014

(51) Int. Cl.
*G06Q 30/02* (2012.01)

(52) U.S. Cl.
CPC .................................. *G06Q 30/0257* (2013.01)

(58) Field of Classification Search
CPC .................................................. G06Q 30/0257
See application file for complete search history.

(56) References Cited

U.S. PATENT DOCUMENTS

2015/0310488 A1* 10/2015 Hess ....................... H04L 67/22
705/14.55

\* cited by examiner

*Primary Examiner* — Kristy A Haupt
(74) *Attorney, Agent, or Firm* — Fountainhead Law Group P.C.

(57) ABSTRACT

Techniques are described for providing an instance of a software application to a potential customer. The application instance can be configured specifically for the potential customer. When a customer request is received from the potential customer, the backend server can determine whether a blank application instance is available in an application instance repository. If available, the blank application instance can be configured using customer data of the potential customer and then provided to the potential customer. By retrieving a blank application instance from the repository rather than generating one on the fly, the backend server can process the customer request in a shorter period of time. In some examples, a clone job can be scheduled to create additional blank application instances to repopulate the application instance repository. The clone job can be created after a configured application instance is provided to the potential customer.

14 Claims, 5 Drawing Sheets

PRE-GENERATING BLANK APPLICATION INSTANCES TO IMPROVE RESPONSE TIME

BACKGROUND

Software companies often offer multiple flavors of a software application. Each flavor can include different functionality. This allows a customer to only purchase the options or functions which the customer is interested in. Depending upon the configuration of the software application, more or fewer functions can be available to the customer. The number of functions can affect the price of a particular flavor of the software application.

Often times a potential customer is unfamiliar with what the software application can offer. As a result, a software company can offer a potential customer a free trial of the software application. The free trial can be a pre-configured version of the software application that allows the potential customer to experiment using the software application before having to commit to purchase. A potential customer can request a free trial by communicating customer information to a backend server of the software company. The backend server processes the customer information and generates an instance of the application for the potential customer to test out. Depending on the size of the application and the server's load or traffic status, it may take a few minutes to a few hours to generate the instance of the application. In the worst case scenario where it takes a few hours, the delay between the customer request and the actual delivery of the free trial can be frustrating to the potential customer, which leads to poor customer satisfaction. The customer may lose interest and decide to forego the free trial. Furthermore, the application instance for the free trial can periodically be generated with faults. The faulty application instance can perform in unexpected ways during the free trial, which can also lead to poor customer satisfaction.

SUMMARY

In one embodiment, a computer-implemented method receives, by a processor, a customer request for a trial instance of an application, the customer request containing customer information associated with a customer. The method then determines, by the processor, that a blank application instance is available in an instance repository. The method then retrieves, by the processor, the blank application instance from the instance repository. The method then configures, by the processor, the blank application instance according to the customer information. The method then assigns, by the processor, the configured application instance to the customer.

In one example, the application instance is a clone from a master application instance. The master application instance can contain a configuration of the application. The configuration can be for a free trial of the application.

In one example, the method can further determine, by the processor, that a total count of application instances in the instance repository is below a predefined threshold and clone, by the processor, one or more blank application instances from the master application instance in response to the determination. Cloning the one or more blank application instances can include scheduling, by the processor, a job to create the one or more blank application instances. The job can be executed during a period of low load on the processor. In one example, the total count of application instances in the instance repository can be above the predefined threshold after generating the one or more blank application instances.

In another embodiment, a non-transitory computer readable storage medium stores one or more programs comprising instructions for receiving a customer request for a trial instance of an application, the customer request containing customer information associated with a customer, determining that a blank application instance is available in an instance repository, retrieving the blank application instance from the instance repository, configuring the blank application instance according to the customer information, and assigning the configured application instance to the customer.

In another embodiment, a computer implemented system comprises one or more computer processors and a non-transitory computer-readable storage medium. The non-transitory computer-readable storage medium comprises instructions, that when executed, control the one or more computer processors to be configured for receiving a customer request for a trial instance of an application, the customer request containing customer information associated with a customer, determining that a blank application instance is available in an instance repository, retrieving the blank application instance from the instance repository, configuring the blank application instance according to the customer information, and assigning the configured application instance to the customer.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Described herein are improved techniques for providing an instance of a software application (i.e., application instance) to a customer (existing or potential). When a customer request for an application instance is received, a blank application instance can be retrieved from an application instance repository and configured using customer information in the customer request. The application instance repository can store a plurality of blank application instances that have been previously generated. A blank application instance is an application instance that is missing customer information. Advantages of pre-generating blank application instances rather than generating an application instance on the fly when a customer request is received is a reduction in the amount of time it takes to process a customer request since the time required for the generation process can be avoided. As a result, a potential customer is able to receive a configured application instance in a shorter amount of time, thus leading to improved customer satisfaction and improved likelihood that the potential customer will purchase the software application. To ensure that the application instance repository is not depleted, techniques are also described for refilling the inventory with blank application instances. Techniques are also described to verify that a generated application instance was properly generated before it is placed within the inventory. This can safeguard the system from delivering free trials which contain errors.

Figure 1:
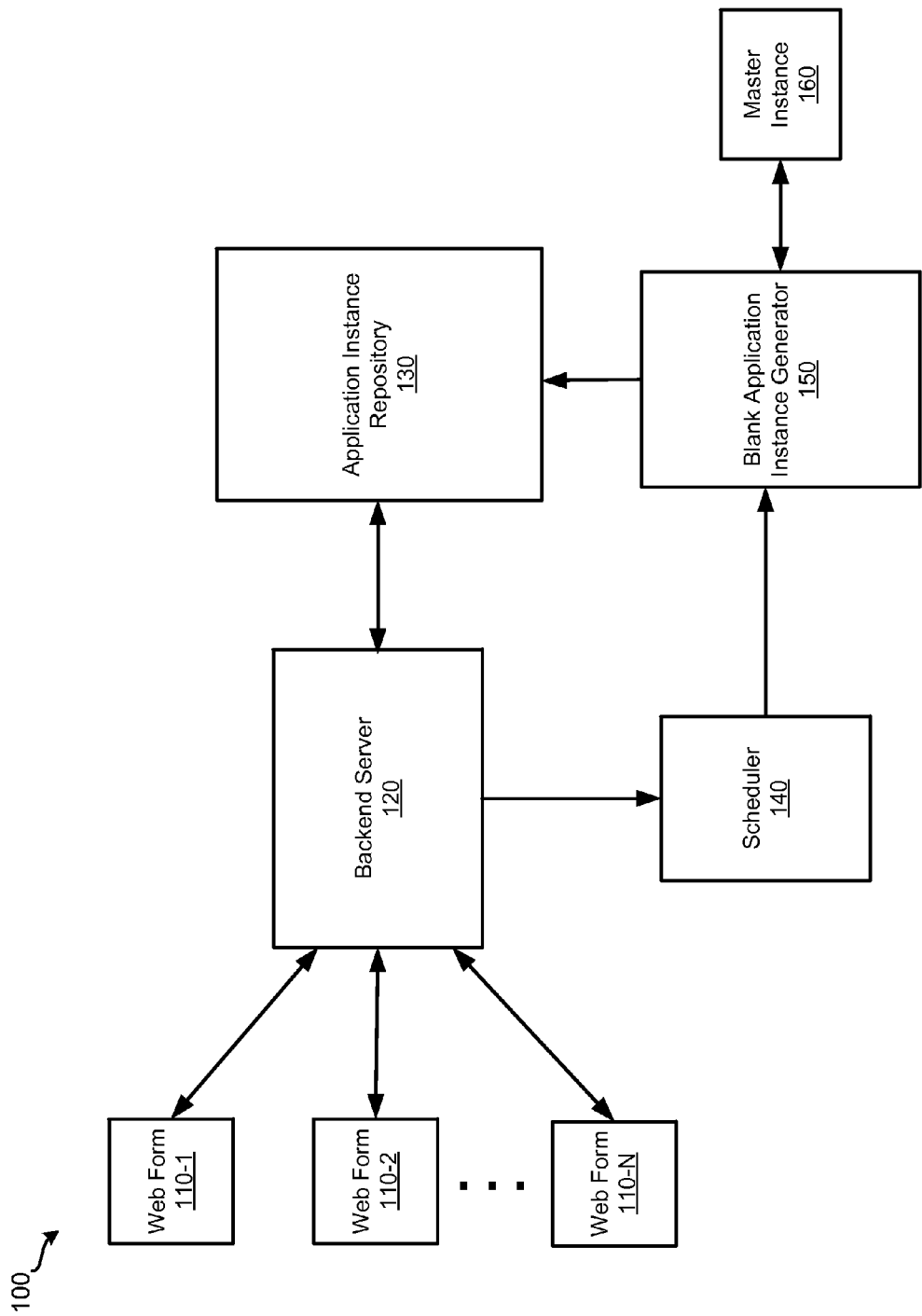
FIG. 1 illustrates a system according to one embodiment.

FIG. 1 illustrates a system according to one embodiment. System 100 can be configured to process customer requests for application instances. In one embodiment, the customer requests can come from potential customers who are requesting a free trial of the application. System 100 includes backend server 120 which is configured to process the customer requests. Each customer request can be received as a web form. As shown here, backend server 120 is receiving web forms 110-1 to 110-N from multiple potential customers. In some examples, a customer can utilize a web browser to populate a web form with customer information. The customer information can include contact information of the customer, such as company name, company size, instance requester's role in the company and contact info which is required by sales to follow up with prospect. Once the web form has been filled out, the web browser can transmit the web form to backend server 120 for processing. In other examples, other techniques can be used to communicate a customer request for an application instance to backend server 120. The customer request can include customer information that is used to configure the application instance. In some examples, the customer information within the customer request can be automatically populated by a device operated by the customer. For instance, customer contact information can be detected from the customer's device and automatically populated into the customer request.

System 100 further includes application instance repository 130. Application instance repository 130 is configured to store an inventory of blank application instances. In one embodiment, application instance repository 130 can store pointers that locate blank application instances that were generated at an earlier point in time. The application instances can be generated and stored in database pools. In another embodiment, storage space can be allocated within application instance repository 130 to store the blank application instances. As customer requests are being processed, a blank application instance from application instance repository 130 can be retrieved and configured for the potential customer. This reduces the delay experienced between the customer request and the delivery of the application instance.

System 100 further includes scheduler 140. Scheduler 140 is configured to store one or more scheduled jobs. When there are available resources in system 100, scheduler 140 can call for the execution of one or more jobs. System 100 further includes blank application instance generator 150. Blank application instance generator 150 is configured to generate blank application instances. In one embodiment, blank application instance generator 150 can clone master instance 160 to create blank application instances. In some embodiments, blank application instance generator 150 can also check the integrity of a generated application instance. In another embodiment, blank application instance generator 150 can detect whether application instance contains faults that can be deleted. Faulty application instances can be deleted and a new application instance can be generated. As a result, the application instances stored within application instance repository 130 can be prequalified.

Figure 2:
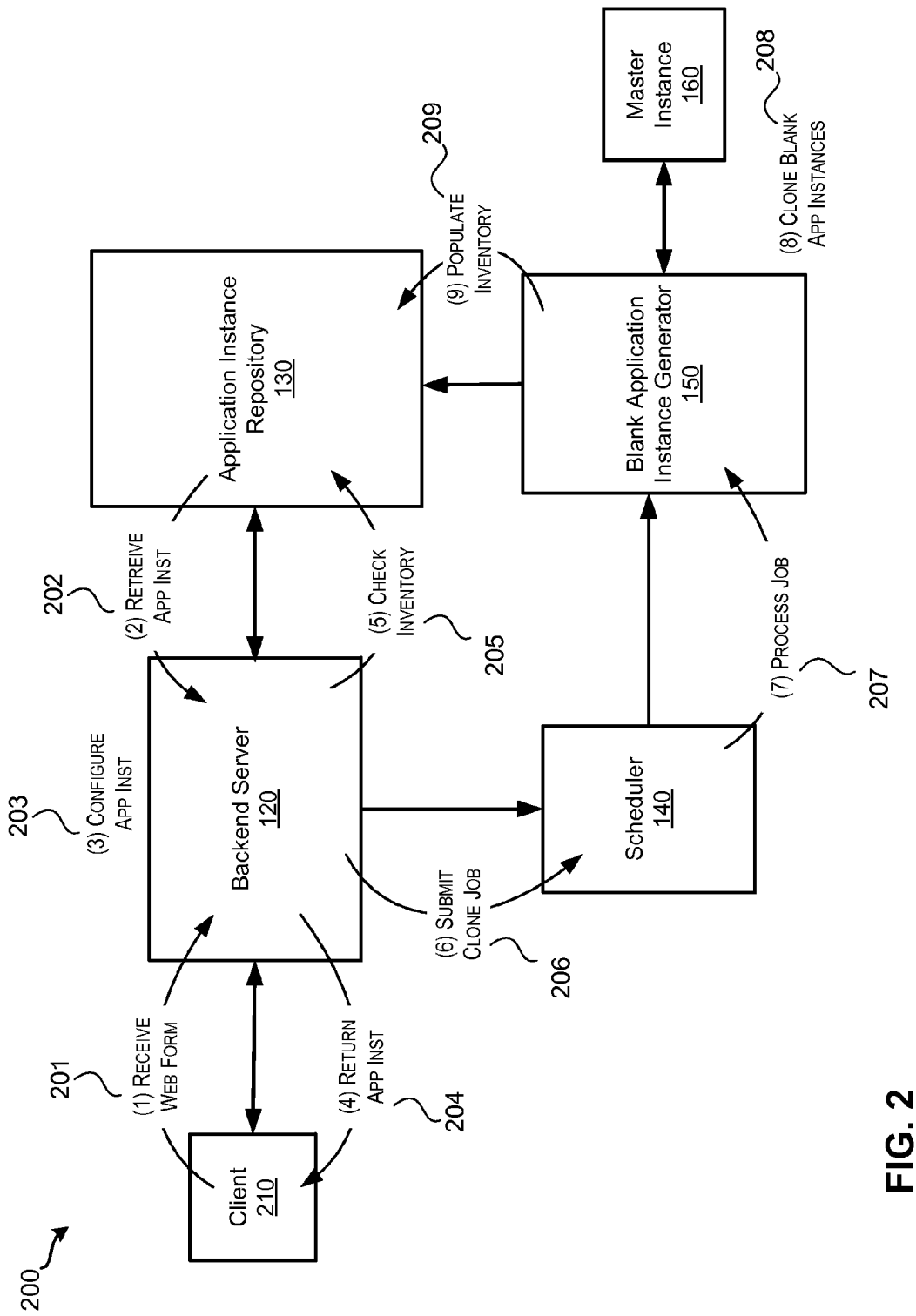
FIG. 2 illustrates a workflow for processing a customer request according to one embodiment.

FIG. 2 illustrates a workflow for processing a customer request according to one embodiment. Workflow 200 can begin at step (1) (reference numeral 201) with backend server 120 receiving a customer request from client 210. The customer request can be for a trial instance of a software application and can include customer information. Alternatively, the customer request can be for a non-trial instance of the software application. For example, a salesman can request a demo instance of the software application. The customer request can be received as a web form. Once the customer request has been received, backend server 120 can query application instance repository 130 for a blank application instance. If one is available, backend server 120 can retrieve a blank application instance from application instance repository 130 at step (2) (reference numeral 202). Alternatively if one is unavailable, backend server 120 can request that a blank application instance be generated dynamically on the fly. To generate a blank application instance dynamically, backend server 120 can schedule a job with scheduler 140 to generate a blank application instance. This job can be set to high priority to ensure that the blank application instance is returned quickly to reduce the period of time that it takes to process the customer request. In some examples, backend server 120 can notify client 210 that the backend server is working on preparing the instance. Alternatively, backend server 120 can communicate directly with blank application instance generator 150 to generate the blank application instance.

A blank application instance is an instance of the software application that does not have customer information set. Thus, the blank application instance is ready for use by a potential customer after it is configured with customer information. In some embodiments, the blank application instance that is provided to a customer in response to a customer request can be pre-generated before the customer request is received. Advantages of pre-generation include a reduction in the processing time to return a configured application instance to the potential customer. As a result, a configured application instance can be returned to the customer in a shorter period of time.

Once the blank application instance is received, backend server 120 can configure the blank application instance at step (3) (reference numeral 203). Configuring the blank application instance can include setting one or more configuration fields of the blank application instance with customer information. The customer information may be information that was received from the customer request. In one example, the customer information can be received from a web form. The configured application instance can be uniquely configured for client 210, which can be a potential customer. The configured application instance can then be returned to client 120 at step (4) (reference numeral 204). In one embodiment, the configured application instance can be stored in the backend and credentials to access the configured application instance can be transmitted to client 210. With the credentials, client 210 can access the configured application instance. In some examples, the configured application instance can be configured to be used for a specified period of time before the free trial ends. Once the free trial ends, the credentials can no longer be used to access the configured application instance and the application instance can be deleted to free up space for other application instances. In some embodiments, backend server 120 can use one process job to configure the application instance and to pass the configured application instance (or credentials the configured application instance) back to client 210.

Once the configured application instance (or credentials to the configured application instance) has been provided to client 210, backend server 120 can check the inventory of application instance repository 130 at step (5) (reference numeral 205). Checking the inventory can include determining the number of blank application instances that remain in application instance repository 130. If the number of blank application instances is less than a predefined minimum threshold, backend server 120 can schedule a job to create additional blank application instances for application instance repository 130. This allows application instance repository 130 to be repopulated when the inventory is low.

If the inventory is low, workflow 200 can continue by submitting a clone job at step (6) (reference numeral 206). The clone job can specify a number of blank application instances to generate for application instance repository 130. In one embodiment, the number can be sufficient to raise the inventory above the predefined minimum threshold. In other embodiments, backend server 120 can execute an algorithm to determine the number of blank application instances to clone. For example, the algorithm can be to generate half of the difference between the predefined minimum threshold and the current inventory. As another example, the algorithm can be to generate the difference between the predefined minimum threshold and the current inventory, except when the difference is greater than a value (e.g., 10), in which case the algorithm generates half of the difference. In yet another example, a fixed number of blank application instances can be generated.

Scheduler 140 can include one or more jobs. The jobs can include clone jobs and also other jobs that are generated by backend server 120. When resources are available in the backend, scheduler 140 can instruct the processing of a clone job in scheduler 140 at step (7) (reference numeral 207). The clone job can be transmitted to blank application instance generator 150, which in turn processes the clone job by cloning master instance 160 to create the desired number of blank application instances at step (8) (reference numeral 208). Master instance 160 can be a version of the application that has been configured for a particular purpose, such as a free trial. Master instance 160 can be configured with tools which the software company would like to offer as part of the free trial. In some examples, blank application instance generator 150 can run each application instance through a validation process to ensure that master instance 160 was cloned without any errors. Errors during the cloning process can result in an application instance that does not perform as it should. Application instances which fail the validation process can be deleted and a new application instance can be generated. In some examples, an upper threshold can be checked during the clone process to ensure that the number of blank application instances stored within application instance repository is below a predefined threshold. Once the application instances are generated (and optionally validated), workflow 200 can continue by populating the newly generated blank application instances into application instance repository 130 at step (9) (reference numeral 209). In some embodiments, steps (8) and (9) can be performed using a single clone job.

Figure 3:
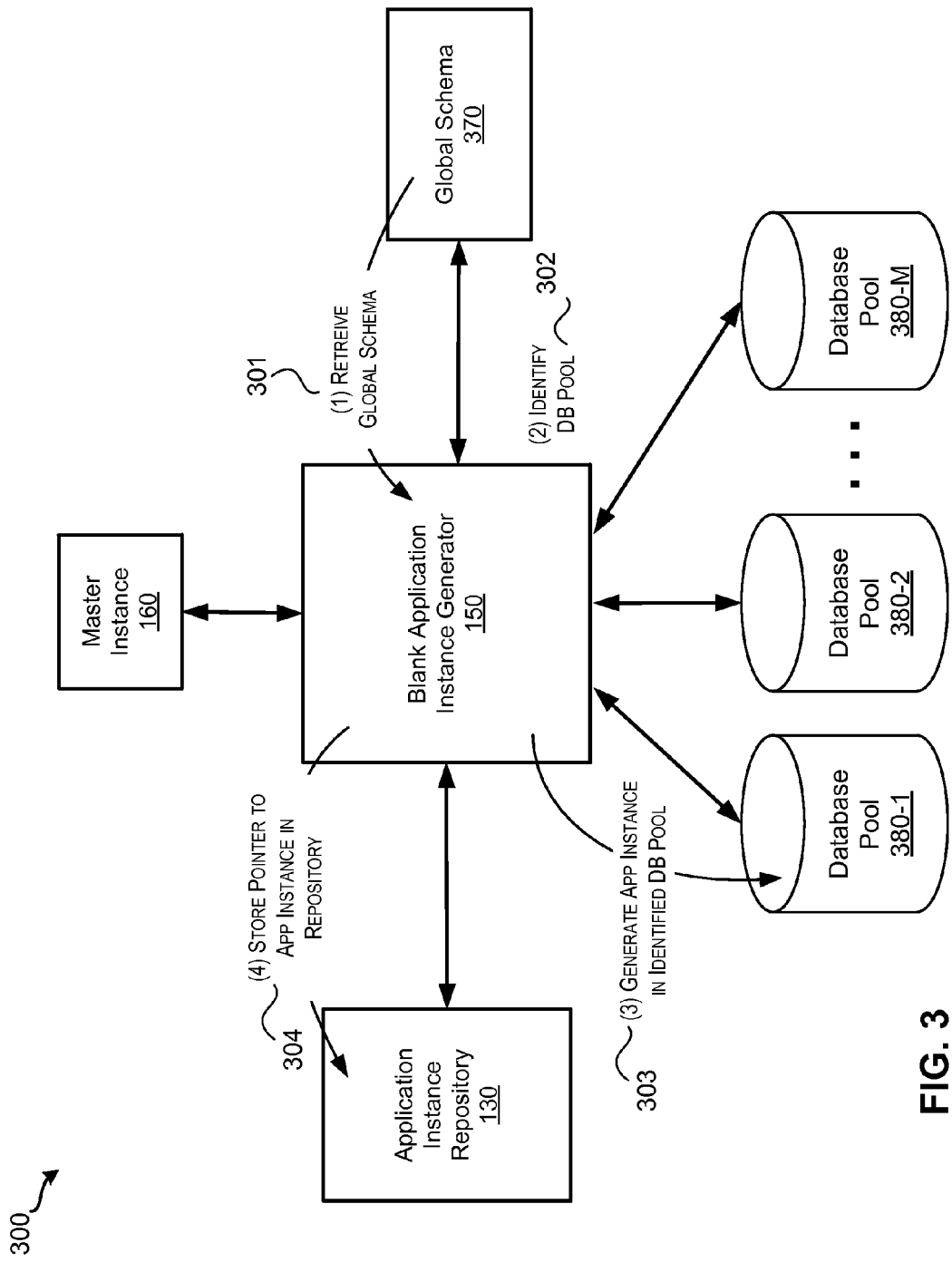
FIG. 3 illustrates a workflow for generating a blank application instance according to one embodiment.

FIG. 3 illustrates a workflow for generating a blank application instance according to one embodiment. As shown workflow 300 includes application instance repository 130, blank application instance generator 150, and master instance 160. These elements are described above in FIGS. 1 and 2. Workflow 300 further includes global schema 370 and database pools 380-1 to 380-M. Global schema 370 is configured to monitor where application instances that have been generated are stored. The generated application instances can be stored in database pools 380-1 to 380-M. As application instances are created and destroyed, the load on a particular database pool can change. As a result, workflow 300 can apply load balancing to balance out the number of application instances that are stored in database pools 380-1 to 380-M.

Workforce 300 can begin with blank application instance generator 150 retrieving global schema 370 at step (1) (reference numeral 301). Blank application instance generator 150 can analyze global schema 370 to identify database pool 380-1 from the collection of database pools 180 at step (2) (reference numeral 302). In one example, database pool 380-1 can be identified as having a lower load than at least one other database pool in database pools 380. In another example, database pool 380-1 can be identified as having the lowest load in the collection of database pools 380. Blank application instance generator 150 can then generate a blank application instance in the identified DB pool at step (3) (reference numeral 303). In one embodiment, generating the blank application instance can include allocating storage for a new application instance and then cloning master instance 160 to the new application instance. Once cloning has occurred, the new application instance has become a blank application instance. In one embodiment, blank application instance generator 150 can optionally validate the blank application instance to ensure that the blank application instance contains no errors from the clone process. Once generated, the blank application instance is stored within database pool 380-1. Workflow 300 can continue by storing a pointer to the blank application instance within application instance repository 130 at step (4) (reference numeral 304). The pointer can be used by backend server 120 to retrieve the blank application instance when processing a customer request for an instance of the application.

Figure 4:
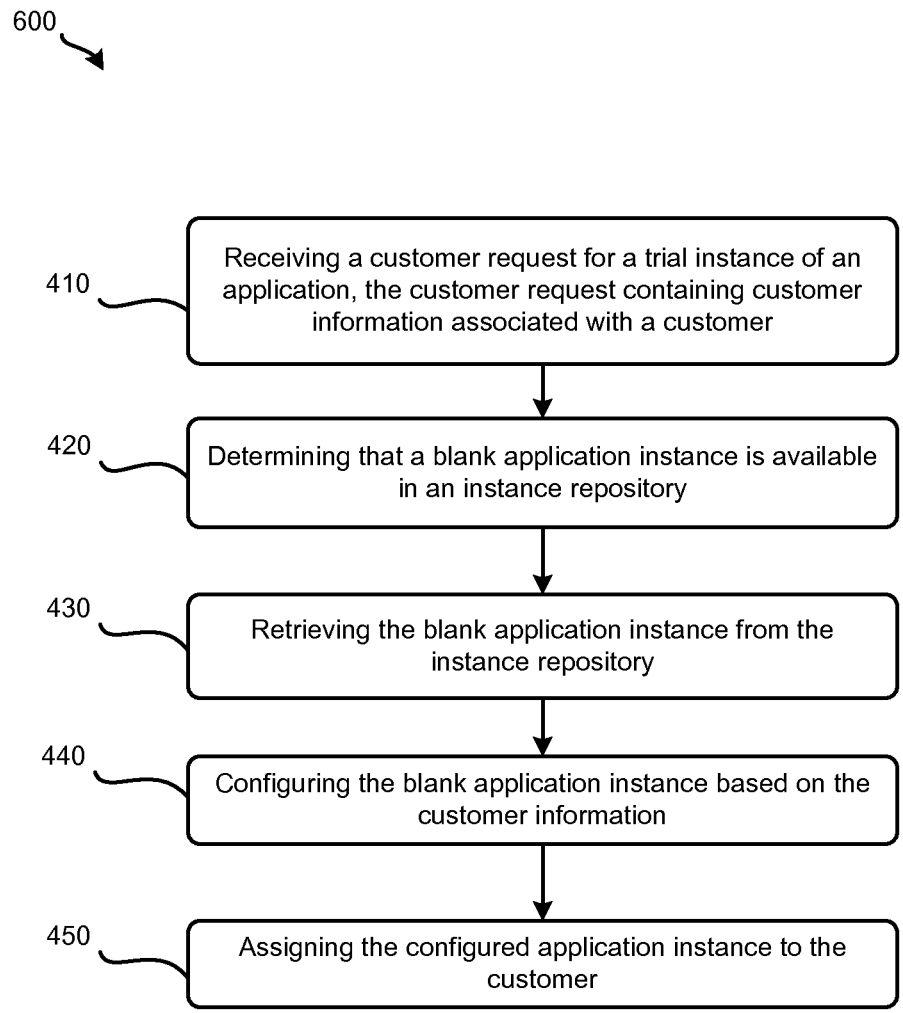
FIG. 4 illustrates a process according to one embodiment.

FIG. 4 illustrates a process according to one embodiment. Process 400 can be stored in computer readable code and executed by a processor. For example, process 400 can be part of the computer readable code that is executed by system 100 of FIG. 1. Process 400 can begin by receiving a customer request for a trial instance of an application at step 410. The customer request can contain customer information associated with the customer. Process 400 can continue by determining that an application instance is available in an instance repository at 420. In one example, process 400 can query the instance repository to request a blank application instance. If the instance repository contains any blank application instances, then process 400 can continue by retrieving a blank application instance from the instance repository at 430. Alternatively if the instance repository does not contain any blank application instances (e.g., the instance repository is empty), the process can request that an application instance be generated dynamically at that point in time.

Once the blank application instance has been retrieved (or dynamically generated if a blank application instance does not exist in the repository), process 400 can continue by configuring the blank application instance according to the customer information at 440. In one example, configuring the blank application instance can include setting one or more properties or configuration parameters of the blank application instance to values received from the customer information. Once the blank application instance has been configured, process 400 can conclude by assigning the configured application instance to the customer at 450. In one example, assigning the configured application instance can include allowing the customer to download the application instance locally. In another example, assigning the configured application instance can include transmitting credential information for the configured application instance to the customer.

With the credential information, the customer can access the configured application instance online. Alternatively, the credential information can allow the customer to download the application instance to run locally on the customer device.

In some embodiments, process 400 can continue by creating a clone job to generate additional blank application instances to repopulate the application instance repository when the application instance repository contains less than a predefined low threshold of blank application instances. During execution of the clone job, sanity checks can be performed to ensure that the number of blank application instances generated do not surpass a predefined high threshold. This helps maintain the number of blank application instances in the repository between the predefined low threshold and the predefined high threshold.

Figure 5:
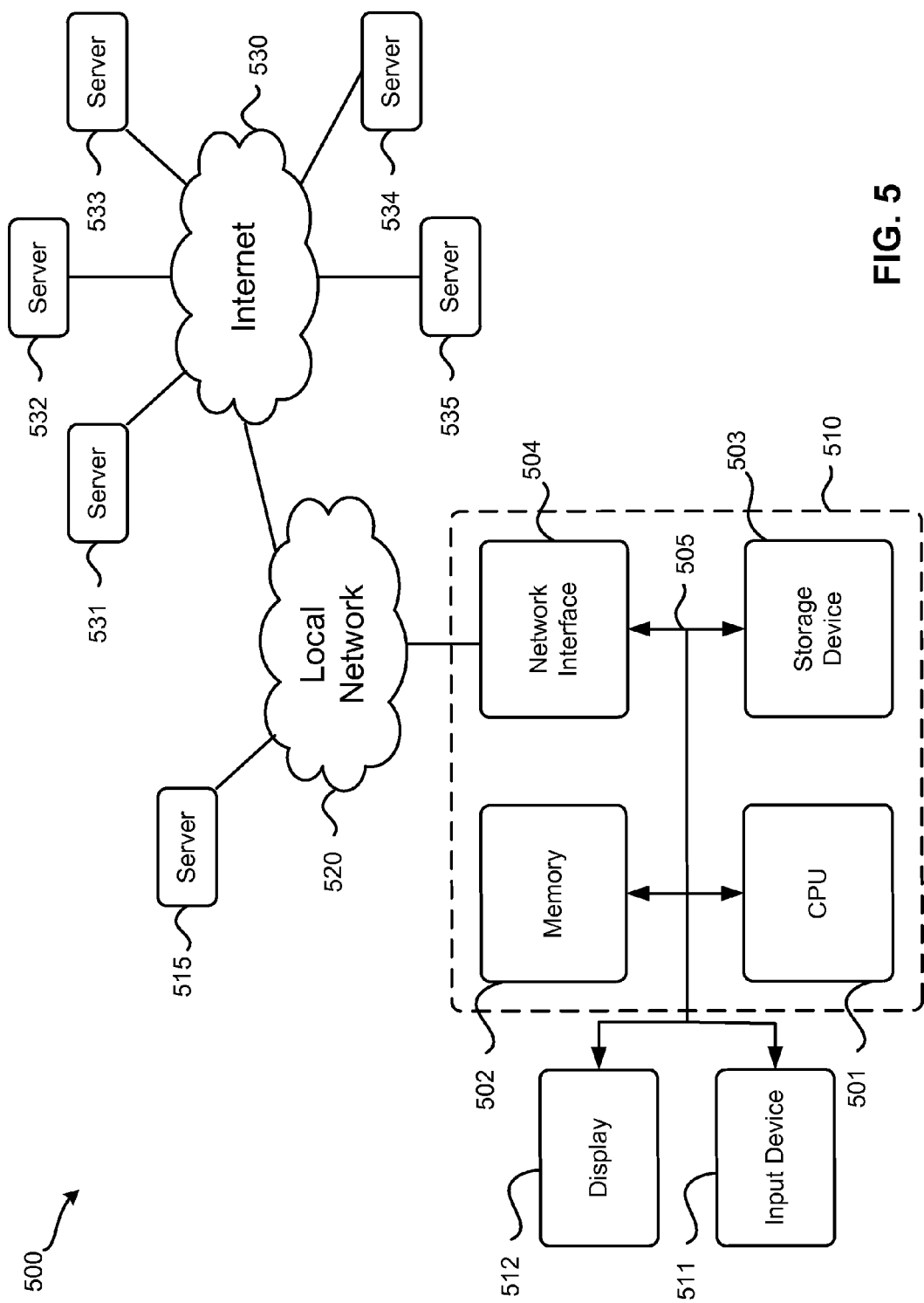
FIG. 5 illustrates an exemplary computer system according to one embodiment.

An exemplary computer system 500 is illustrated in FIG. 5. Computer system 510 includes a bus 505 or other communication mechanism for communicating information, and a processor 501 coupled with bus 505 for processing information. Computer system 510 also includes memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable mediums.

Computer system 510 may be coupled via bus 505 to a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information, including messages or other interface actions, through the network interface 504 across a local network 520, an Intranet, or the Internet 530. For a local network, computer system 510 may communicate with a plurality of other computer machines, such as server 515. Accordingly, computer system 510 and server computer systems represented by server 515 may form a cloud computing network, which may be programmed with processes described herein. In the Internet example, software components or services may reside on multiple different computer systems 510 or servers 531-535 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method, comprising:
    receiving, by a processor, a customer request for a trial instance of an application, the customer request containing customer information associated with a customer;
    determining, by the processor, that a blank application instance is available in an instance repository, wherein the blank application instance is a clone from a master application instance;
    retrieving, by the processor, the blank application instance from the instance repository;
    configuring, by the processor, the blank application instance according to the customer information;
    assigning, by the processor, the configured application instance to the customer;
    determining, by the processor, that a total count of blank application instances in the instance repository is below a predefined threshold; and
    cloning, by the processor, one or more blank application instances from the master application instance in response to the determination.

2. The computer-implemented method of claim 1, wherein the master application instance contains a configuration of the application.

3. The computer-implemented method of claim 1, wherein cloning the one or more blank application instances further comprises:
    scheduling, by the processor, a job to create the one or more blank application instances.

4. The computer-implemented method of claim 3, wherein the job is executed during a period of low load on the processor.

5. The computer-implemented method of claim 1, wherein the total count of application instances in the instance repository is above the predefined threshold after generating the one or more blank application instances.

6. A non-transitory computer readable storage medium storing one or more programs, the one or more programs comprising instructions for:
    receiving a customer request for a trial instance of an application, the customer request containing customer information associated with a customer;
    determining that a blank application instance is available in an instance repository, wherein the blank application instance is a clone from a master application instance;

retrieving the blank application instance from the instance repository;

configuring the blank application instance according to the customer information;

assigning the configured application instance to the customer;

determining that a total count of blank application instances in the instance repository is below a predefined threshold; and cloning one or more blank application instances from the master application instance in response to the determination.

7. The non-transitory computer readable storage medium of claim 6, wherein the master application instance contains a configuration of the application.

8. The non-transitory computer readable storage medium of claim 6, wherein cloning the one or more blank application instances further comprises:

scheduling a job to create the one or more blank application instances.

9. The non-transitory computer readable storage medium of claim 8, wherein the job is executed during a period of low load on the processor.

10. The non-transitory computer readable storage medium of claim 6, wherein the total count of application instances in the instance repository is above the predefined threshold after generating the one or more blank application instances.

11. A computer implemented system, comprising:
one or more computer processors; and
a non-transitory computer-readable storage medium comprising instructions, that when executed, control the one or more computer processors to be configured for:

receiving a customer request for a trial instance of an application, the customer request containing customer information associated with a customer;

determining that a blank application instance is available in an instance repository wherein the blank application instance is a clone from a master application instance that contains a configuration of the application;

retrieving the blank application instance from the instance repository;

configuring the blank application instance according to the customer information;

assigning the configured application instance to the customer;

determining that a total count of blank application instances in the instance repository is below a predefined threshold; and cloning one or more blank application instances from the master application instance in response to the determination.

12. The computer implemented system of claim 11, wherein cloning the one or more blank application instances further comprises:

scheduling a job to create the one or more blank application instances.

13. The computer implemented system of claim 12, wherein the job is executed during a period of low load on the processor.

14. The computer implemented system of claim 11, wherein the total count of application instances in the instance repository is above the predefined threshold after generating the one or more blank application instances.

* * * * *